(12) United States Patent
Ha et al.

(10) Patent No.: US 12,459,770 B2
(45) Date of Patent: Nov. 4, 2025

(54) AUTO SPLICING DEVICE AND AUTO SPLICING METHOD FOR ELECTRODE

(71) Applicant: LG Energy Solution, Ltd., Seoul (KR)

(72) Inventors: Sangsu Ha, Daejeon (KR); Ki Woog Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/273,366

(22) PCT Filed: Nov. 10, 2022

(86) PCT No.: PCT/KR2022/017640
§ 371 (c)(1),
(2) Date: Jul. 20, 2023

(87) PCT Pub. No.: WO2023/106656
PCT Pub. Date: Jun. 15, 2023

(65) Prior Publication Data
US 2024/0308803 A1 Sep. 19, 2024

(30) Foreign Application Priority Data

Dec. 8, 2021 (KR) .................. 10-2021-0174586

(51) Int. Cl.
*B65H 19/18* (2006.01)
*B65H 23/02* (2006.01)
(Continued)

(52) U.S. Cl.
CPC ..... *B65H 19/1852* (2013.01); *B65H 23/0204* (2013.01); *B65H 26/02* (2013.01);
(Continued)

(58) Field of Classification Search
CPC B65H 19/1852; B65H 23/0204; B65H 21/02; B65H 2553/80
See application file for complete search history.

(56) References Cited

U.S. PATENT DOCUMENTS

2014/0353125 A1 12/2014 Iwata et al.
2018/0162668 A1 6/2018 Hong
(Continued)

FOREIGN PATENT DOCUMENTS

EP 3826085 A1 5/2021
JP H09194090 A 7/1997
(Continued)

OTHER PUBLICATIONS

English translation of KR101819729 (Year: 2018).*
(Continued)

*Primary Examiner* — Scott W Dodds
(74) *Attorney, Agent, or Firm* — Lerner David LLP (57) ABSTRACT

One aspect of the present disclosure relates to an auto-splicing device for an electrode and an auto-splicing method, and more particularly, to an auto-splicing device for an electrode and an auto-splicing method, which can minimize connection defects between the running electrode and the new electrode, wherein the running electrode and the new electrode connected and supplied to the running electrode are aligned on the basis of their coating lines by using the auto-slicing device.

6 Claims, 7 Drawing Sheets (51) Int. Cl.
*B65H 26/02* (2006.01)
*H01M 10/04* (2006.01)

(52) U.S. Cl.
CPC ..... *H01M 10/0404* (2013.01); *B65H 2553/80* (2013.01); *B65H 2701/12411* (2013.01); *B65H 2701/19* (2013.01)

(56) References Cited

U.S. PATENT DOCUMENTS

2020/0108960 A1* 4/2020 Shimoda ................ B65B 51/16
2022/0363505 A1* 11/2022 Lee ................... H01M 10/0404

FOREIGN PATENT DOCUMENTS

| JP | 2013165025 | A | 8/2013 | | |
|---|---|---|---|---|---|
| KR | 101342711 | B1 | 12/2013 | | |
| KR | 101479723 | B1 | 1/2015 | | |
| KR | 101479724 | B1 | 1/2015 | | |
| KR | 20150079358 | A | 7/2015 | | |
| KR | 101827204 | B1 | 2/2018 | | |
| KR | 101819729 | B1 | * 3/2018 | ............ | H01M 4/139 |
| KR | 20180068788 | A | 6/2018 | | |
| KR | 20180069390 | A | 6/2018 | | |
| KR | 102043024 | B1 | 11/2019 | | |
| KR | 102253132 | B1 | 5/2021 | | |
| KR | 20210058130 | A | 5/2021 | | |
| WO | 2021096068 | A1 | 5/2021 | | |

OTHER PUBLICATIONS

Extended European Search Report including Written Opinion for Application No. 22904489.6 dated Jun. 28, 2024, pp. 1-8.
International Search Report for Application No. PCT/KR2022/017640 mailed Feb. 24, 2023, pp. 1-3.

* cited by examiner

AUTO SPLICING DEVICE AND AUTO SPLICING METHOD FOR ELECTRODE

CROSS-REFERENCE TO RELATED APPLICATIONS

The present application is a national phase entry under 35 U.S.C. § 371 of International Application No. PCT/KR2022/017640, filed on Nov. 10, 2022, which claims priority from Korean Patent Application No. 10-2021-0174586, filed on Dec. 8, 2021, all of which are hereby incorporated by reference herein.

TECHNICAL FIELD

One aspect of the present disclosure relates to an auto-splicing device for an electrode and an auto-splicing method used when supplying an electrode by a notching process using a roll-to-roll method during a secondary battery manufacturing process.

BACKGROUND ART

A notching process in the secondary battery manufacturing process means a process of cutting out electrodes.

In the notching process, the electrode to be notched is supplied while unwinding the electrode wound in a roll shape.

At this time, when the supply to one electrode wound in the roll shape is completed, the electrode needs to be replaced with another electrode, and a process of automatically connecting the electrode to be replaced is called an auto splicing process. At this time, an electrode that is being supplied can be called a running electrode, and an electrode that is replaced and continuously supplied subsequent to the running electrode can be called a new electrode. Specifically, the running electrode and the new electrode may be in the form of electrode sheets, and the electrode sheets can be supplied to the notching process and cut into individual electrodes.

The auto-splicing process performed currently has problems such as overhang due to the formation of an electrode gap at an electrode connection when an electrode distortion and a position defect of a coating line occur due to the meandering of the running electrode and the new electrode at the time when the electrode is replaced. At this time, the overhang refers to a defect that occurs when a cathode, a separator, and an anode are stacked in the post-notching process, wherein the gap between the cathode, the separator, and the anode is out of a specified specification.

In addition, there is a problem that correction is impossible when meandering occurs between the running electrode and the new electrode.

In addition, although two EPC (Edge Position Control) sensors sense the running electrode and the new electrode, because they sense different surfaces of the running electrode and the new electrode, dimensional defects may occur when connecting the two electrodes, and a process capability may degrade accordingly.

As described above, in the conventional auto-splicing process, it is difficult to correct the meandering even when the meandering of the running electrode and the new electrode occurs when connecting the electrodes. Further, a gap may occur between the running electrode and the new electrode due to a limit in position at which the EPC sensor is installed. As a result, coating line dimension defects may occur before/after the connection between the manufactured electrodes, and the process capability may degrade. Therefore, it is necessary to develop a technology that can solve such problems.

PRIOR ART DOCUMENT

Patent Document (Patent Document 1) Korean Patent No. 1479724

DISCLOSURE

Technical Problem

The inventors of the present invention conducted multi-faceted research to solve the above problems, and as a result, it was confirmed that the meandering of the running electrode and the new electrode can be prevented, and the formation of a gap at the connection between the running electrode and the new electrode can be minimized, by disposing an EPC, which is a sensor that senses the running electrode, and an EPC, which senses the new electrode supplied continuously subsequent to the running electrode, to face the same direction in an auto-splicing device for an electrode, thereby sensing the coating line formed on one surface of the running electrode and the coating line formed on one surface of the new electrode. In this case, the one surface of the running electrode the one surface of the new electrode sensed by the EPC mean the surfaces that are connected as the same surface at the time of connection.

Accordingly, an object of one aspect of the present disclosure is to provide an auto-splicing device for an electrode and an auto-splicing method that can correct meandering between splicing electrodes of the electrode and match and connect the coating lines of the electrodes.

Technical Solution

Accordingly, one aspect of the present disclosure provides an auto-splicing device for an electrode, including a first electrode conveying unit; a second electrode conveying unit; and an electrode supply unit, wherein the first electrode conveying unit includes a first unwinding unit which unwinds a first electrode; a first conveying unit which conveys the unwound first electrode; and a first splicing unit which connects a second electrode to the first electrode when the unwinding of the conveyed first electrode is completed, the second electrode conveying unit includes a second unwinding unit which unwinds the second electrode; a second conveying unit which conveys the unwound second electrode; and a second splicing unit which connects the second electrode to the first electrode, the first splicing unit or the second splicing unit includes a first Edge Position Control (EPC) sensor and a second EPC sensor on both side surfaces, the first EPC sensor and the second EPC sensor are disposed to face the same direction to sense one electrode surface of the first electrode and one electrode surface of the second electrode located on the same plane when the first electrode and the second electrode are connected, and the first EPC sensor senses a coating line formed on one electrode surface of the first electrode, and the second EPC sensor senses a coating line formed on one electrode surface of the second electrode.

The first electrode may include a first electrode surface and a second electrode surface, and the first electrode may be wound so that the first electrode surface faces the center of a roll, and the second electrode surface faces the outside of the roll.

The second electrode may include a first electrode surface and a second electrode surface, and the second electrode may be wound so that the first electrode surface faces the center of the roll, and the second electrode surface faces the outside of the roll.

The first EPC sensor may sense the coating line of the second electrode surface of the first electrode, and the second EPC sensor may sense the coating line of the second electrode surface of the second electrode.

The first electrode conveying unit and the second electrode conveying unit may be kept separated from each other, and when the unwinding of the first electrode in the first electrode conveying unit is completed, the first unwinding portion may be separated from the first splicing unit, and the first splicing unit and the second splicing unit may be joined to connect the first electrode and the second electrode and supply the first electrode and the second electrode to the electrode supply unit.

The electrode supply unit may include a third EPC sensor that senses the second electrode surface of the first electrode and the second electrode surface of the second electrode connected as above.

Further, one aspect of the present disclosure provides an auto-splicing method including the steps of (a) unwinding a first electrode and supplying it to a notching process; (b) cutting a lower end of the first electrode; (c) sensing and aligning coating lines of the cut first electrode and a second electrode connected to the first electrode; and (d) connecting one end of the first electrode and one end of the second electrode by aligning on the basis of the sensed coating line, wherein the coating line formed on one surface of the first electrode and the coating line formed on one surface of the second electrode located on the same plane are each sensed and aligned by a first EPC and a second EPC.

When meandering of the first electrode and the second electrode occurs, after stopping the first electrode, a correction of aligning the coating line formed on one electrode surface of the first electrode and the coating line formed on one electrode surface of the second electrode located on the same plane may be performed.

Advantageous Effects

According to the auto-splicing device and method for electrode according to one aspect of the present disclosure, since the electrode splicing process is performed by matching the coating lines of the electrodes, it is possible to prevent the occurrence of gap at the electrode connections, and correct the meandering even when meandering occurs at the electrode connections.

BEST MODE

Hereinafter, although the embodiment of the present invention will be described with reference to the drawings, this is for easier understanding of the present invention and the scope of the present invention is not limited thereto.

As used herein, the term coating line refers to a boundary between a holding portion, which is a portion of an electrode tab coated with an electrode active material, and an uncoated portion, which is a portion not coated with the electrode active material.

Figure 1:
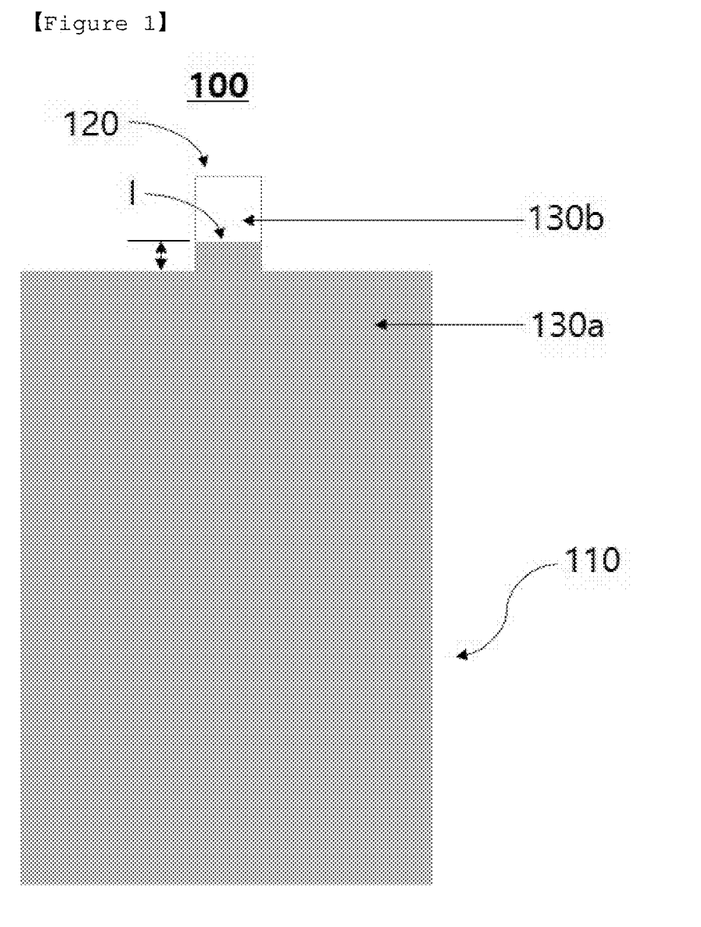
FIG. 1 is a schematic diagram showing a position of a coating line in an electrode.

FIG. 1 is a schematic diagram showing a position of coating line in the electrode.

Referring to FIG. 1, an electrode 100 includes an electrode surface 110 and an electrode tab 120 protruding from a distal end of electrode surface 110. The surface of the electrode surface 110 may have an electrode coating layer coated with an electrode active material. An electrode coating layer may be formed on both surfaces of the electrode 100. In an electrode manufacturing procedure, the electrode tab 120 formed by a notching process includes a portion formed with the electrode coating layer and a portion formed with no electrode coating layer. In the electrode 100, the portion formed with the electrode coating layer is called a holding unit 130a, and the portion formed with no electrode coating layer is called an uncoated unit 130b. A boundary of the holding unit 130a, which is the portion formed with the electrode coating layer inside the electrode tab 120, is called a shoulder line I, and is also called a coating line (I). At this time, when there is a difference in the height of coating lines formed on both surfaces of the electrode, this is called a mismatch. When it deviates from the specified specifications of the coating line, problems such as overhangs may occur.

As used herein, the terms "first electrode" and "second electrode" refer to adjacent electrode sheets of a plurality of electrode sheets supplied continuously, and do not refer to application of only two electrodes in the auto-splicing process according to the present invention.

Auto-Splicing Device for Electrode

One aspect of the present disclosure relates to an auto-splicing device for an electrode, and can be used when supplying electrodes by the notching process using a roll-to-roll method during the manufacturing process of a secondary battery.

Figure 2A:
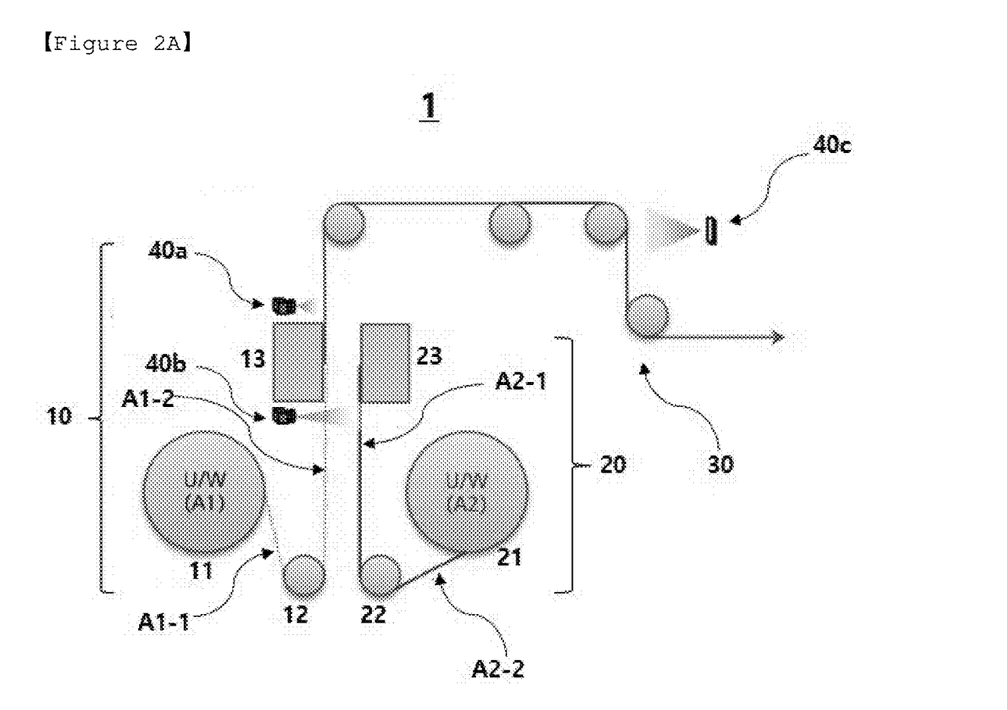
FIG. 2A is a schematic diagram of an auto-splicing device for an electrode according to an embodiment of one aspect of the present disclosure.
Figure 2B:
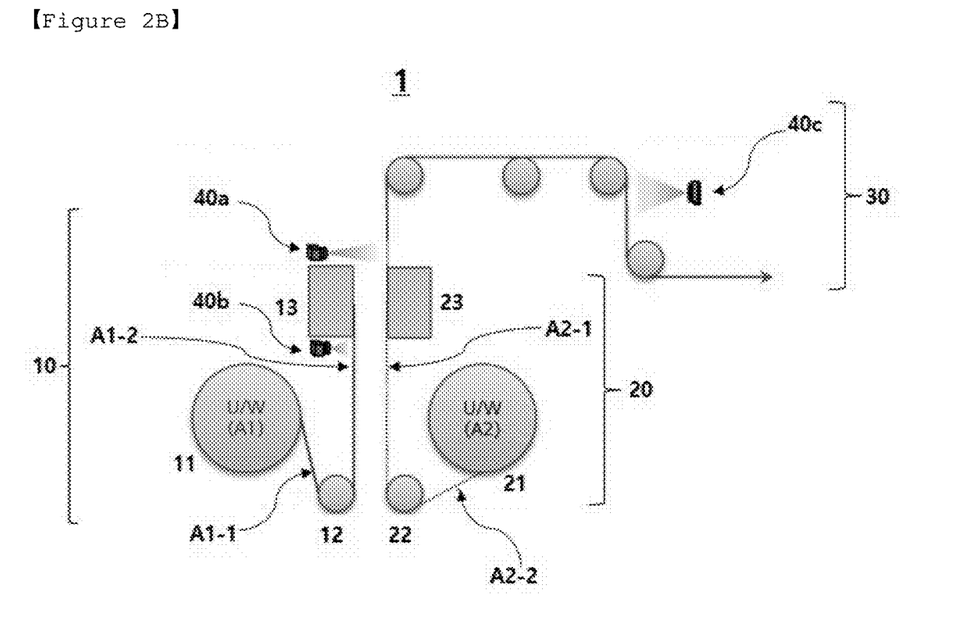
FIG. 2B is a schematic diagram of an auto-splicing device for an electrode according to another embodiment of one aspect of the present disclosure.

FIG. 2A is a schematic diagram of an auto-splicing device for an electrode according to an embodiment of one aspect of the present disclosure. FIG. 2B is a schematic diagram of an auto-splicing device for an electrode according to another embodiment of one aspect of the present disclosure.

As shown in FIG. 2A, an auto-splicing device for an electrode 1 according to an embodiment of one aspect of the present disclosure includes a first electrode conveying unit 10, a second electrode conveying unit 20, and electrode supply unit 30. At this time, the electrode being supplied is called a running electrode, and after the running electrode is used up, when an electrode connected and supplied to the running electrode is called a new electrode, the first electrode A1 is the running electrode and the second electrode A2 is the new electrode.

Further, the first electrode conveying unit 10 includes a first unwinding unit 11 that unwinds the first electrode A1; a first conveying unit 12 that conveys the unwound first electrode A1; and a first splicing unit 13 that connects the second electrode A2 to the first electrode A1 when unwinding of the conveyed first electrode A1 is completed. At this time, the first unwinding unit 11 may include an unwinder (U/W).

In addition, the second electrode conveying unit 20 includes a second unwinding unit 21 that unwinds the second electrode A2; a second conveying unit 22 that conveys the unwound second electrode A2; and a second splicing unit 23 that connects the second electrode A2 to the first electrode A1. At this time, the second unwinding unit 12 may include an unwinder (U/W).

In addition, a first Edge Position Control (EPC) sensor 40a and a second EPC sensor 40b disposed toward the same direction are included on both side surfaces of the first splicing unit 13, the first EPC sensor 40a senses the first electrode A1, and the second EPC sensor 40b senses the second electrode A2.

The first electrode A1 includes a first electrode surface A1-1 and a second electrode surface A1-2, the first electrode surface A1-1 of the first electrode A1 is wound in the form toward the center of a roll, and the second electrode surface A1-2 is wound in the form toward the outside of the roll.

The second electrode A2 includes a first electrode surface A2-1 and a second electrode surface A2-2, the first electrode surface A2-1 of the second electrode A2 is wound in a form toward the center of the roll, and second electrode surface A2-2 is wound in the form toward the outside of the roll.

At this time, when the first electrode A1 is unwound by the first unwinding unit 11, conveyed by the first conveying unit 12, and then supplied to the electrode supply unit 30 and used up, the second electrode A2 is connected and continuously supplied to the first electrode A1. Depending on the process, electrodes such as a third electrode and a fourth electrode can also be continuously supplied.

Each electrode coating layer is formed on both surfaces of the first e electrode A1 and the second electrode A2, and a boundary line between the holding portion formed with the electrode coating layer and the non-coating portion formed with no electrode coating layer is called a coating line.

When the second electrode A2 is continuously supplied subsequent to the first electrode A1, the first electrode surface A1-1 of the first electrode A1 and the second electrode surface A1-1 of the second electrode A2 are continued on the same plane, and the second electrode surface A1-2 of the first electrode A1 and the second electrode surface A1-2 of the second electrode A2 are continued on the same plane. At this time, since the second electrode surface A1-2 of the first electrode A1 and the second electrode surface A1-2 of the second electrode A2 are aligned and connected on the basis of each coating line, errors in connection sites can be minimized.

Therefore, there is a need for a means capable of sensing the electrode surfaces to align the coating line, in the procedure of unwinding and conveying the second electrode surface A1-2 of the first electrode A1 and the second electrode surface A1-2 of the second electrode A2.

A first EPC sensor 40a and a second EPC sensor 40b located on both side surfaces of the first splicing unit 13 sense the first electrode A1, and the second EPC sensor 40b senses the second electrode A2. Specifically, the first EPC sensor 40a senses the second electrode surface A1-2 of the first electrode A1 unwound from the first unwinding unit 11, and the second EPC sensor 40b senses the second electrode surface A2-2 of the second electrode A2. Therefore, since the correct position of the coating line is sensed by the first EPC sensor 40a and the second EPC sensor 40b, and the aligned second electrode surfaces A1-2 and A2-2 are connected to connect the first electrode A1 and the second electrode A2, the gap due to their mismatch can be minimized.

Alternatively, the first EPC sensor 40a and the second EPC sensor 40b may be disposed on both side surfaces of the second splicing unit 23 (not shown). The first EPC sensor 40a and the second EPC sensor 40b may be located in the same direction to sense the electrode surfaces on which the coating lines of the first and second electrodes are aligned.

In addition, when meandering occurs in the procedure of connecting the first electrode A1 and the second electrode A2, the correction may be conducted by performing a work of adjusting the alignment of the coating lines of the first electrode A1 and the second electrode A2 before splicing for connecting the first electrode A1 and the second electrode A2.

For example, the first electrode A1, which is the running electrode, is stopped and the lower end of the first electrode A1 is cut off. After sensing the coating lines of the first electrode A1 and the second electrode A2 using the first EPC sensor 40a and the second EPC sensor 40b, the first and second electrodes are moved and connected so that one end of the first electrode A1 is joined to one end of the second electrode A2 connected to one end of the first electrode A1, and both electrodes are connected so that the coating lines of the first electrode A1 and the second electrode A2 are aligned in one line to perform auto-splicing, thereby enabling correction of the meandering.

Also, the electrode supply unit 30 to which the connected first electrode A1 and the second electrode A2 are supplied may include a third EPC sensor 40c. At this time, the connected first electrode A1 and second electrode A2 may be supplied to a notching process for cutting out individual electrodes.

Like the first EPC sensor 40a and the second EPC sensor 40b, the third EPC sensor 40c continuously senses the second electrode surface A1-2 of the first electrode and the second electrode surface A2-2 of the second electrode, and checks whether the alignment of their coating lines is maintained so as not to deviate from the defined specifications in the notching process, thereby enabling the correction when the meandering occurs.

In addition, the first electrode conveying unit 10 and the second electrode conveying unit 20 are kept separated from each other.

When the unwinding of the first electrode is completed in the first electrode conveying unit 10, the first unwinding unit 11 and the first conveying unit 12 are separated from the first splicing unit 13, the first splicing unit 13 and the second splicing unit 23 are joined, and then, the first electrode A1 and the second electrode A21 may be connected and supplied to the electrode supply unit 30.

FIG. 2B shows a case where the second electrode A2 is the running electrode and the first electrode A1 is the new electrode, and the driving principle is the same as that of the embodiment according to FIG. 2A.

Figure 3:
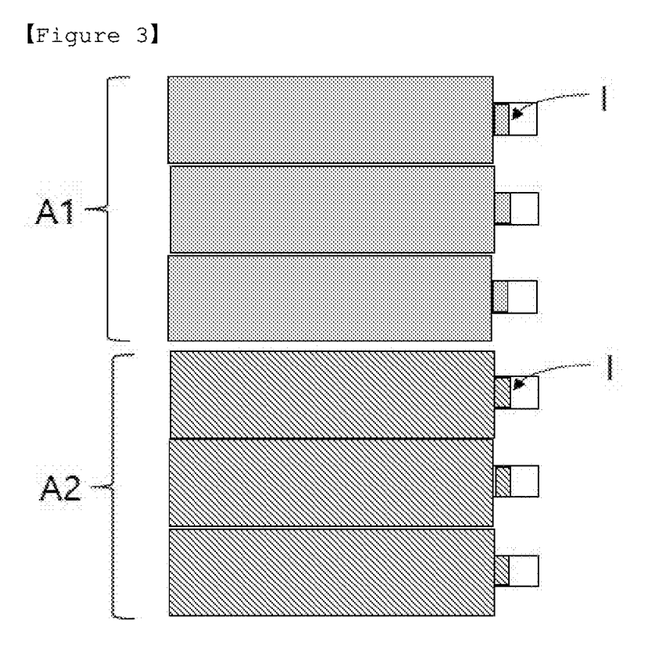
FIG. 3 is a schematic diagram of a first electrode A1 and a second electrode A2 connected according to an embodiment of one aspect of the present disclosure.

FIG. 3 is a schematic diagram of a first electrode A1 and a second electrode A2 connected according to an embodiment of one aspect of the present disclosure. At this time, the first electrode A1 may be the running electrode, and the second electrode A2 may be the new electrode.

As shown in FIG. 3, the first electrode A1 and the second electrode A2 may be connected on the basis of the coating line I aligned by the first EPC sensor and the second EPC sensor.

For example, the electrode surfaces sensed by the first EPC sensor and the second EPC sensor may be the second electrode surface A1-2 of the first electrode A1 and the second electrode surface A2-2 of the second electrode A2.

Auto-Splicing Method for Electrode

The other aspect of the present disclosure also relates to an auto-splicing method for electrode, and can be applied when electrodes are supplied to a notching process using a roll-to-roll method during the manufacturing process of the secondary battery.

Figure 4:
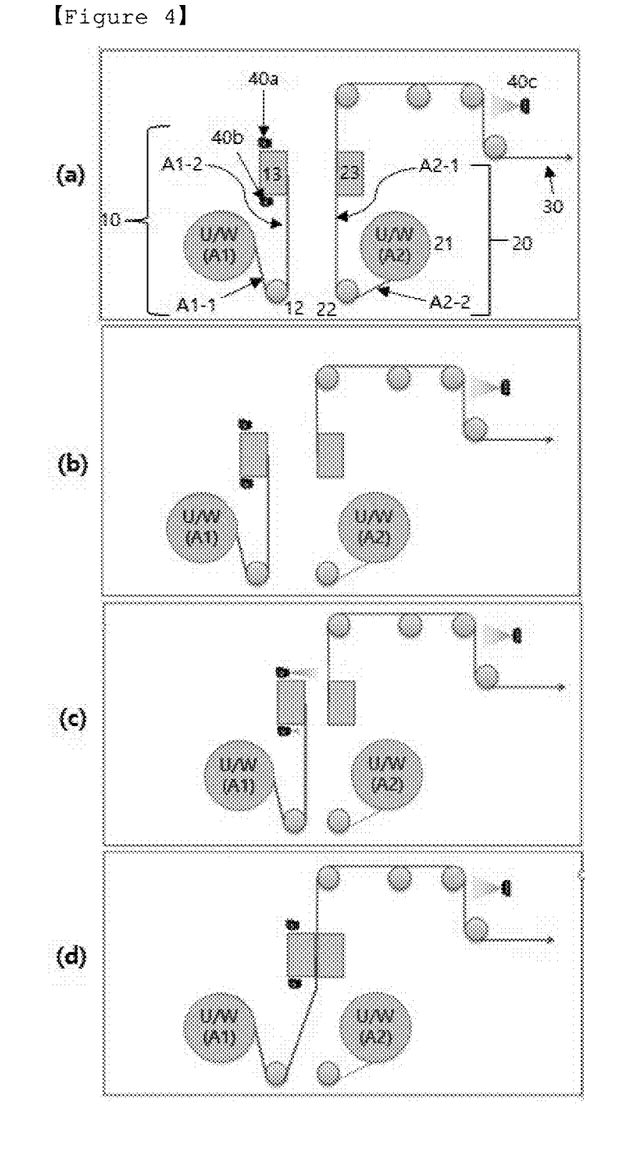
FIG. 4 is a schematic diagram showing an auto-splicing process for an electrode according to an embodiment of the other aspect of the present disclosure.

FIG. 4 is a schematic diagram showing an auto-splicing process for electrode according to an embodiment of the other aspect of the present disclosure.

As shown in FIG. 4, the auto-splicing process for electrode according to an embodiment of the other aspect of the present disclosure includes (a) a step of unwinding a first electrode and supplying it to the notching process (step 1); (b) a step of cutting a lower end of the first electrode (step 2); (c) a step of sensing and aligning coating lines of the cut first electrode and the second electrode connected to the first electrode (step 3); and (d) a step of connecting one end of the first electrode and one end of the second electrode by aligning on the basis of the sensed coating line (step 4), wherein the coating line formed on one surface of the first electrode and the coating line formed on one surface of the second electrode located on the same plane may be sensed and aligned by the first EPC and the second EPC, respectively.

Also, the first EPC sensor and the second EPC sensor sense whether the alignment between the coating line formed on one surface of the first electrode and the coating line formed on one surface of the second electrode is maintained. If meandering occurs due to misalignment of the coating line from the reference line, the auto-splicing work can be performed again after performing the correcting work for aligning the coating line between the first electrode and the second electrode.

Also, after the auto-splicing process is completed by connecting the first electrode and the second electrode, the notching process may be performed by the electrode supply unit. At this time, it is possible to continuously sense whether the alignment of the coating lines of the first electrode and the second electrode is maintained by the third EPC sensor located in the electrode supply unit. The third EPC sensor may sense the coating line of the same electrode surface sensed by the first EPC sensor and the second EPC sensor.

Figure 5A:
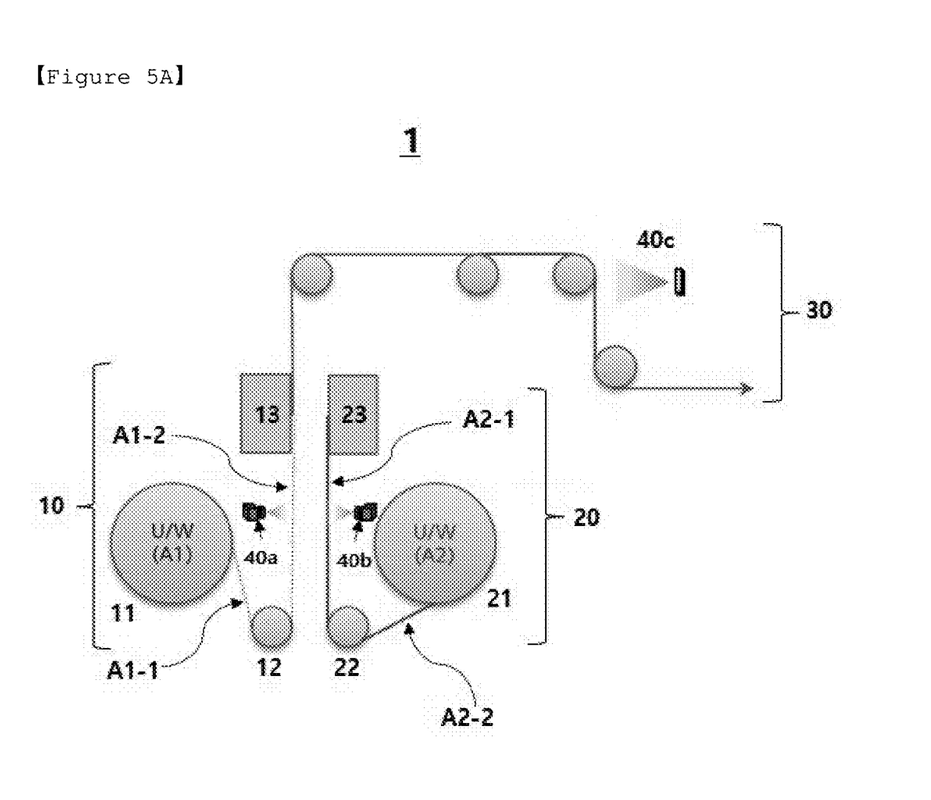
FIGS. 5A and 5B are schematic diagrams of an auto-splicing process using a conventional auto-splicing device.
Figure 5B:
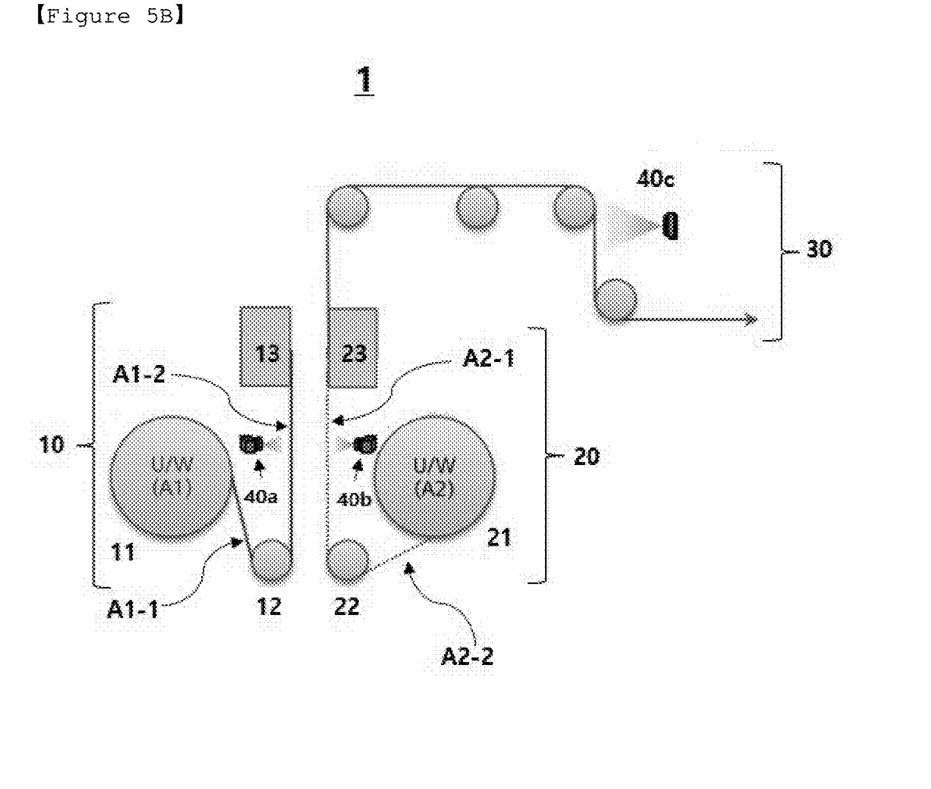

FIGS. 5A and 5B are schematic diagrams of an auto-splicing process using a conventional auto-splicing device as a comparative embodiment of the other aspect of the present disclosure.

FIG. 5A is a schematic diagram of the auto-splicing process in which the running electrode A1 is replaced with the new electrode A2, and the auto-splicing device 1 includes a first electrode conveying unit 10, a second electrode conveying unit 20, and an electrode supply unit 30.

Further, the first electrode conveying unit 10 includes a first unwinding unit 11 that unwinds the first electrode A1; a first conveying unit 12 that conveys the unwound first electrode A1; and a first splicing unit 13 that connects the second electrode A2 to the first electrode A1 when unwinding of the conveyed first electrode A1 is completed.

In addition, the second electrode conveying unit 20 includes a second unwinding unit 21 that unwinds the second electrode A2; a second conveying unit 22 that conveys the unwound second electrode A2; and a second splicing unit 23 that connects the second electrode A2 to the first electrode A1.

In addition, a first Edge Position Control (EPC) sensor 40a is located in the first splicing unit 13, and a second EPC sensor 40b is located in the second splicing unit 23. The first EPC sensor 40a senses the second electrode surface A1-2 of the first electrode, and the second EPC sensor 40b senses the first electrode surface A2-1 of the second electrode.

When the first electrode and the second electrode are connected, the first electrode surface A1-1 of the first electrode A1 and the first electrode surface A2-1 of the second electrode A2 are located on the same plane, and the second electrode surface A1-2 of the first electrode and the second electrode surface A2-2 of the second electrode A2 are located on the same plane.

However, as described above, since the first EPC sensor 40a senses the second electrode surface A1-2 of the first electrode A1, and the second EPC sensor senses the first electrode surface A2-1 of the second electrode A2 to sense the electrode surfaces that are not located on the same plane and align their coating lines, a defect may occur in connection sites when these electrodes are connected.

FIG. 5B is a schematic diagram of an auto-splicing process in which the running electrode A2 is replaced with a new electrode A1, and the same problem as that of the auto-splicing process of FIG. 5A may occur.

According to the auto-splicing process using the above-described conventional auto-splicing device, the meandering of the running electrode and the new electrode at the time of electrode replacement causes the electrode to twist, and the poor position of the coating line of the electrode may cause a gap at the connection portion between the running electrode and the new electrode, which may cause a problem of overhang. At this time, the meandering means that the running electrode or the new electrode is misaligned compared to a path line, and correction is not possible even when the meandering occurs.

Also, since the running electrode is sensed on the second electrode surface by the first EPC sensor, while the new electrode is sensed on the first electrode surface, different surfaces of the electrode are sensed and it is difficult to precisely match the coating lines of the running electrode and the new electrode, and gaps may occur between the running electrode and the new electrode at the time of the auto-splicing process.

FIG. 5B is a schematic diagram of the auto-splicing process in which the running electrode A2 is replaced with the new electrode A1, in which the positions of the running electrode and the new electrode are changed compared to FIG. 5A, and the same problem as that of the auto-splicing process of FIG. 5A may occur.

Those who have ordinary knowledge in the field to which the present invention pertains can make various applications and modifications within the scope of the present invention based on the above content.

Although the present invention has been described with limited embodiments and drawings, the present invention is not limited thereto, and it goes without saying that various modifications and variations can be made within the technical concept of the present invention and the equivalent scope of the claims to be described below by those who have ordinary knowledge in the technical field to which the present invention pertains.

DESCRIPTION OF SYMBOLS

1: Auto-splicing device
10: First electrode conveying unit
11: First winding unit
12: First conveying unit
13: First splicing unit
20: Second electrode conveying unit
21: Second winding unit
22: Second conveying unit
23: Second splicing unit
30: Electrode supply unit
40a: First EPC sensor
40b: Second EPC sensor
40c: Third EPC sensor
A1: First electrode
A2: Second electrode
100: Electrode
110: Electrode coating layer
I: Coating line

The invention claimed is:

1. An auto-splicing device for an electrode, comprising:
an electrode supply unit;
a first electrode conveying unit comprising a first unwinding unit which is configured to unwind a first electrode; a first conveying unit which is configured to convey the unwound first electrode; and a first splicing unit which is configured to connect a second electrode to the first electrode when unwinding of the conveyed first electrode is completed; and
a second electrode conveying unit comprising a second unwinding unit which is configured to unwind the second electrode; a second conveying unit which is configured to convey the unwound second electrode; and a second splicing unit which is configured to connect the second electrode to the first electrode,
wherein the first splicing unit or the second splicing unit comprises a first Edge Position Control (EPC) sensor and a second EPC sensor facing side surfaces of the first electrode or the second electrode,
the first EPC sensor and the second EPC sensor face the same direction to sense one electrode surface of the first electrode and one electrode surface of the second electrode located on the same plane when the first electrode and the second electrode are connected, and
the first EPC sensor is configured to sense a coating line formed on one electrode surface of the first electrode, and the second EPC sensor is configured to sense a coating line formed on one electrode surface of the second electrode.

2. The auto-splicing device according to claim 1, wherein the first electrode comprises a first electrode surface and a second electrode surface, and the first electrode is wound so that the first electrode surface faces a center of a roll, and the second electrode surface faces an outside of the roll.

3. The auto-splicing device according to claim 1, wherein the second electrode comprises a first electrode surface and a second electrode surface, and the second electrode is wound so that the first electrode surface faces a center of a roll, and the second electrode surface faces an outside of the roll.

4. The auto-splicing device according to claim 1, wherein the first EPC sensor is configured to sense the coating line of the second electrode surface of the first electrode, and the second EPC sensor is configured to sense the coating line of the second electrode surface of the second electrode.

5. The auto-splicing device according to claim 1, wherein the first electrode conveying unit and the second electrode conveying unit are spaced apart from each other, and the auto-splicing device is configured such that when the unwinding of the first electrode in the first electrode conveying unit is completed, the first unwinding unit is spaced apart from the first splicing unit, and the first splicing unit and the second splicing unit connect and supply the first electrode and the second electrode to the electrode supply unit.

6. The auto-splicing device according to claim 1, wherein the electrode supply unit comprises a third EPC sensor that is configured to sense the second electrode surface of the first electrode and the second electrode surface of the second electrode.

* * * * *